INVENTOR.
Charles E. Hajny
BY
Seegert & Schwalbach
Att'ys

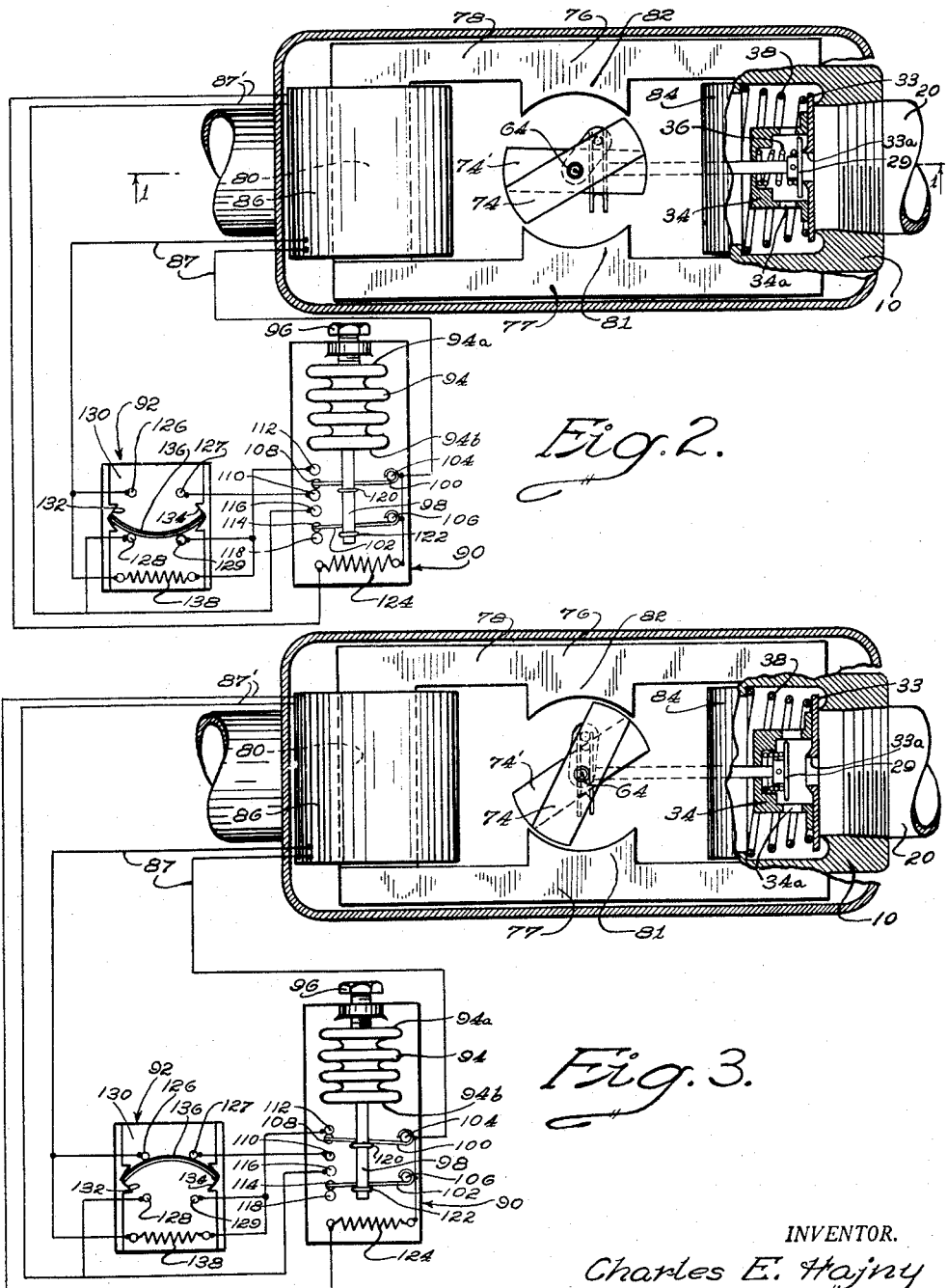

June 9, 1959 C. E. HAJNY 2,890,016
CONTROL APPARATUS AND DEVICES THEREFOR
Filed Aug. 29, 1955 5 Sheets-Sheet 5

INVENTOR.
Charles E. Hajny
BY
Seegert & Schwalbach
Attys

United States Patent Office 2,890,016
Patented June 9, 1959

2,890,016

CONTROL APPARATUS AND DEVICES THEREFOR

Charles E. Hajny, Milwaukee, Wis., assignor to Baso Inc., Milwaukee, Wis., a corporation of Wisconsin Application August 29, 1955, Serial No. 531,057

14 Claims. (Cl. 251—137)

The present invention relates to control apparatus and to control devices for use therein, and more particularly to plural stage temperature responsive fuel flow control for fluid fuel burning apparatus and to devices for effecting such control.

The present invention may be employed in any one of a variety of applications, but for the purpose of setting forth a specific application thereof, it is herein shown and described with reference to fluid fuel burning heating apparatus. It has been found desirable in the heating field to provide temperature control apparatus wherein the heat producing characteristics of a flame are maintained proportional to the difference between the actual temperature and the desired temperature, thereby providing more heat whenever a large temperature difference exists and less heat when only a small difference exists. One method of affording such control is to provide a two stage temperature responsive control apparatus which provides a high heat flame whenever the aforementioned temperature difference is above a predetermined value and to provide a low heat flame whenever such difference is below such value. The subject invention provides means for effecting the latter control functions and employs a two stage thermostat for positioning a fluid flow control member in flow preventing position or in either a high heat flame or a low heat flame position depending upon the temperature condition prevailing.

A general object of the present invention, therefore, is to provide fluid flow control apparatus for use with fluid fuel burning heating apparatus and including means capable of sensing and distinguishing between several conditions so as to provide a low heat flame upon occurrence of a first condition and to provide a high heat flame upon occurrence of a second condition.

Another object of the present invention is to provide control apparatus having the aforementioned characteristics and including a fluid flow control member and operating means therefor comprising a magnetically permeable core member having various flux paths, means for selectively diverting magnetic flux from one to another of such paths, and a magnetically permeable rotor operatively associated with said flow control member and with said flux paths whereby diverting of said flux from one to another of said flux paths effects movement of said rotor, and hence said flow control member, from one to another of its controlling positions.

A more specific object of the present invention is to provide in control apparatus of the aforementioned character, a control device having magnetically permeable core means having a primary flux path and at least two auxiliary flux paths, there being a first coil for said primary flux path and a second coil for one of said auxiliary paths, wherefore shorting of said first coil causes the flux in said primary path to induce a current flow in said first coil whereupon the permeability of said primary flux path is altered substantially, thereby causing a substantial portion of the flux in said primary flux path to be diverted to said one of said auxiliary paths; subsequent shorting of said second coil affording further diversion of the flux to the other of said auxiliary paths by alteration of the magnetic permeability of said one auxiliary path to thereby provide three positions of the rotor member associated with said flux paths and three corresponding positions for the fluid flow control member associated with said rotor.

Another object of the present invention is to provide, in a control apparatus of the aforementioned character having a flow control member and operating means therefor to position said control member in an initial flow-preventing position and in one or the other of two operating positions upon occurrence of one of the other of two conditions selectively, means for preventing movement of said control member from said initial to said one operating position and for insuring movement thereof to said other operating position upon occurrence of either of said two conditions while said control member is in its initial position.

Another more specific object of the present invention is to provide, in a control apparatus of the aforementioned character having operating means including a two stage condition responsive switch sequentially operable from an off position to a first position and then to a second position to thereby sequentially move the control member from flow interrupting position to a first operating position and then to a second operating position, warp switch means rendering movement of said switch from its off position to its first position incapable, for a predetermined length of time, of affording movement of said control member from flow interrupting position to its first operating position; said warp switch being ineffective after said predetermined time whereupon movement of said switch to one of its positions causes corresponding movement of said control member.

Another more specific object of the present invention is to provide in a control apparatus of the aforementioned character a two stage condition responsive device having first and second sets of electrical contacts and switch operator means therefor to provide sequential operation of said contacts, whereby first one and then the other of said contact sets is moved to a given position.

The novel features which I consider characteristic of the present invention are set forth with particularity in the appended claims. The device itself, however, both as to its organization and mode of operation together with additional objects and advantages thereof will best be understood from the following description of specific embodiments when read in connection with the accompanying drawings, in which:

Figure 2 is a fragmentary sectional view taken substantially along line 2—2 of Figure 1 schematically showing the first embodiment in circuit with a two stage condition responsive device and with a heat responsive warp switch;

Figure 3 is similar to Figure 2 but shows the fluid flow control member in its first or low heat flame position;

Like reference characters indicate corresponding parts throughout the several views of the drawings.

Figure 1:
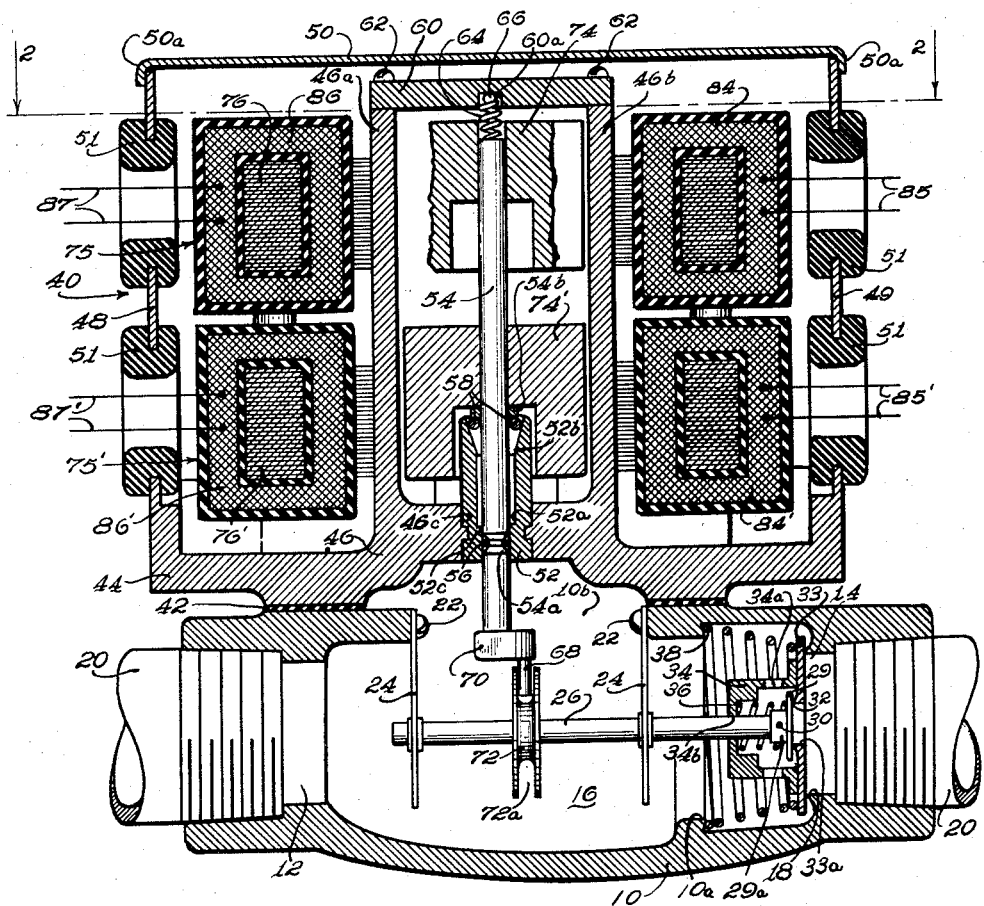
Figure 1 is a fragmentary sectional view of a first embodiment of the present invention having a fluid flow control member and operating means therefor in an initial "off" position.

Referring to Figure 1, numeral 10 designates a valve body formed of an inlet opening 12, an outlet opening 14 and an intermediate chamber 16 to afford communication therebetween. Also formed in body 10 and positioned between outlet opening 14 and chamber 16 is a valve seat 18. Inlet opening 12 and outlet opening 14 are each formed with internal pipe threads to afford connection thereof with contiguous sections of fluid fuel supply conduit 20.

Secured within chamber 16 of valve body 10 by means such as screws 22, are supporting springs 24, of flat spiral configuration. Fixed to the central portion of said springs 24 is a valve stem 26; said springs positioning said stem substantially coaxially of valve seat 18 and biasing the same to a given position as will hereinafter appear.

Pivotally mounted on one end of stem 26 by means of a transverse pin 30, is a valve member 29 formed with a collar 29a. Valve member 29 is movable relative to a valve seat 32 surrounding a central aperture 33a formed in valve disk 33; the latter being movable with respect to valve seat 18. A cup-shaped member 34 is fixed to valve disk 33 by means such as welding, and is formed with an opening 34b for receipt of valve stem 26. Member 34 is further formed with radial ports or openings 34a to permit fluid flow between inlet 12 and outlet 14 whenever valve member 29 is in flow-permitting position with respect to seat 32.

A compression spring 36 is interposed between cup-shaped member 34 and valve member 29 to bias the latter toward engagement with valve seat 32. A compression spring 38 having a force greater than that of compression spring 36 is positioned between valve disk 33 and an annular ledge or shoulder 10a formed in valve body 10 and said spring biases the valve disk 33 toward engagement with valve seat 18.

Fixed to valve body 10, in any desired manner, is an electromagnetic operating mechanism 40 for operation of valve member 29 and valve disk 33. Gas tight sealing means such as gasket 42 is interposed between the housing 44 of the mechanism 40 and valve body 10 to prevent escape of fluid fuel therebetween. The electromagnetic operating mechanism 40 comprises the housing or enclosure 44 having a bottom wall 46 and end walls 48 and 49, each of the latter of which is formed with a pair of openings. A grommet 51 is positioned in each of such openings to provide insulated apertures through which electrical leads are extended for connection of the electromagnetic mechanism to suitable circuit controlling devices and an external source of power. A cover plate 50 for the housing 44 has a peripheral flange 50a and is removably attached to the walls of said housing by any suitable means (not shown) to provide complete enclosure of the electromagnetic operating mechanism to be hereinafter described.

Formed integrally with bottom wall 46 are upstanding arms 46a and 46b, said bottom wall 46 also being formed with an opening 46c within which a sleeve 52 is non-rotatably secured. Sleeve 52 is formed with an axial bore 52c and with a counterbore 52a, one end of which is flared to provide a bevelled or tapered surface 52b. A shaft 54 is slidably positioned within the bore 52c, and an O-ring 56 is disposed within a circumferential groove 54a in the shaft 54 to provide a gas tight seal between said shaft and the bore 52c and prevent escape of fluid fuel along said shaft. Positioned between shaft 54 and the tapered surface 52b of sleeve 52 are bearings 58 which are engaged by a shoulder member 54b integral with said shaft and disposed on said bearings. The bearings 58 prevent lateral movement of shaft 54 with respect to sleeve 52 while rotatably supporting said shaft and the elements carried thereby hereinafter referred to.

A bearing plate 60 is fixed to the upper ends of upstanding arms 46a and 46b by means of screws 62. Interposed between the upper end of shaft 54 and bearing plate 60 is a compression spring 64 and a thrust bearing 66, the latter being disposed within a recess 60a formed in the under side of said bearing plate. The compression spring 64 and thrust bearing 66 cooperate to apply an endwise thrust biasing the shaft 54 downwardly while permitting rotational movement thereof.

The end of shaft 54 opposite the thrust bearing is provided with a crank arm 70 which carries a pin 68 offset from the axis of said shaft. A yoke 72 fixed to shaft 26 intermediate flat springs 24 is formed with a peripheral groove 72a for receipt of the pin 68, whereby rotational movement of the shaft 54 is translated into reciprocatory movement of the stem 26 against the bias of the supporting springs 24.

Rigidly fixed to shaft 54 in any desired manner, such as by use of keys or set screws (not shown), are armature members 74 and 74' for cooperation respectively with power units 75 and 75' which may be identical in construction and operation. For a purpose to be hereinafter explained in detail, armature members 74 and 74' are fixed to shaft 54 in predetermined rotationally displaced positions with respect to each other.

Figure 4:
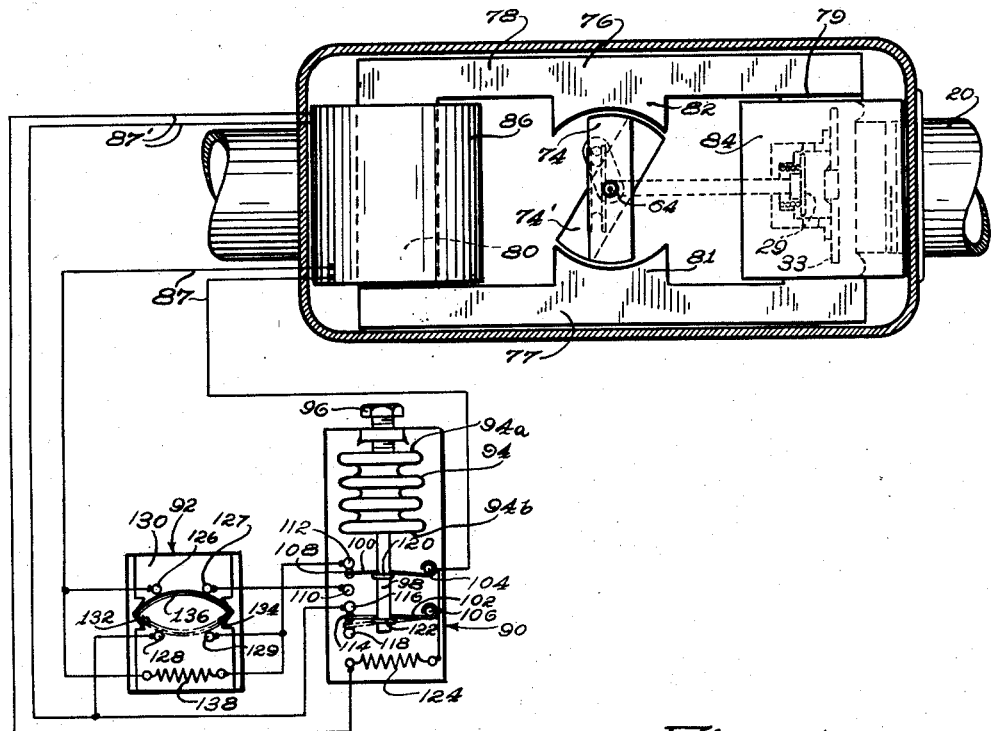
Figure 4 is similar to Figures 2 and 3 but shows the fluid flow control member in its second or high heat flame position.

Each of power units 75 and 75' comprises a magnetically permeable core member 76 and 76' respectively; such core members being formed of laminations to provide generally rectangular configurations as best shown in Figures 2, 3 and 4. The core members 76 and 76' are formed with side legs 77—78 and 77'—78' respectively, connected respectively by end legs 79—80 and 79'—80'. Side legs 77, 78, 77' and 78' are each formed with a pole piece denoted respectively with designations 81, 82, 81' and 82'; each pole piece extending from its respective side leg inwardly, as shown, for cooperation with the oppositely disposed pole piece to form a path, including an air gap, for the flow of magnetic flux. Each of such pole pieces is formed with an arcuate surface, every point of which is substantially equidistant from the axis of rotation of shaft 54. Armature members 74 and 74' each have a pair of arcuately shaped exterior surfaces formed substantially complementally of the arcuately shaped surfaces of the oppositely disposed pole pieces.

As clearly shown in Figures 2, 3 and 4, armature members 74 and 74' can be rotated between pole pieces 81—82 and 81'—82' respectively, to thereby vary the air gap between the respective pole pieces and hence the magnetic permeability of the flux path between said pole pieces. Thus, as magnetic flux is caused to traverse one or the other of such air gaps, the respective armature is attracted to a position where the permeability of the flux path is substantially increased. Such rotational movement of one or the other of armature members 74 and 74' is transmitted to shaft 54 and, through the offset pin 68, is translated into reciprocatory movement of shaft 26 as heretofore explained.

In order to provide flux flow in core members 76 and 76' the end legs 79 and 79' are provided with primary windings 84 and 84' respectively, having circuit connecting means 85 and 85' respectively which extend through grommets 51 in side wall 49 to an external source of power. Secondary windings 86 and 86' are wound respectively on end legs 80 and 80' and have circuit connecting means 87 and 87', respectively, which extend through grommets 51 in side wall 48 of enclosure 44.

Energization of the primary windings 84 and 84' while the secondary windings 86 and 86' are in open circuit condition, creates a flow of flux in each of core members 76 and 76'. Such flux is necessarily concentrated in the path of highest magnetic permeability; namely, primary paths including legs 77, 78, 79 and 80 and legs 77', 78', 79' and 80' respectively. Referring to power unit 75 only, in order to divert an appreciable portion of the flux flowing in said primary path to a secondary path including pole pieces 81 and 82, it is merely necessary to short circuit the secondary winding 86, whereupon the flux flowing through end leg 80 induces a current flow in said winding 86. This induced current creates flux lines which tend to flow through leg 80 in the direction opposite to the direction of the flux afforded by the primary winding 84, thereby changing the magnetic permeability of the leg 80 and causing an appreciable portion of the flux produced by the primary winding to be diverted across the air gap between the pole pieces 81 and 82. Such diverted flux follows a secondary path comprising end legs 79, pole pieces 81 and 82 and a portion of each of side legs 77 and 78.

Similar flux diversion also takes place in power unit 75' whenever the secondary winding 86' is short circuited while flux is flowing in the primary flux path 77', 78', 79' and 80'. Short circuiting of secondary winding 86' changes the magnetic permeability of the end leg 80' to cause an appreciable portion of the flux produced by primary winding 84' to following the secondary path including end leg 79', pole pieces 81' and 82' and a portion of each of side legs 77' and 78'.

Flux flow across the air gap between pole pieces 81 and 82 causes armature member 74 to be rotated against the bias of springs 24 from its initial position, shown in Figure 2, to its attracted position with respect to such pole pieces, shown in Figure 3. Such rotational movement of armature member 74 effects rotation of shaft 54, and through said shaft, movement of the valve stem 26 for a predetermined distance to the left as viewed in Figure 1. Such movement of stem 26 is sufficient to move valve member 29 to its flow-permitting position shown in Figure 3, but is insufficient to move valve disk 33 from engagement with valve seat 18. The valve member 29 when thus opened permits fuel to flow from the inlet chamber 12 through the intermediate chamber 16, ports 34a of cup-shaped member 34 and past the valve seat 32, through the port 33a to the outlet chamber 14; such fluid fuel then being transmitted by conduit 20 to, for example, any desired fluid fuel burning device. It will be noted that ports 34a and 33a are of such size as to permit only a small quantity of fluid fuel to flow to the fuel burning device, thereby providing only a small or low heat flame for the main burner thereof.

The aforementioned rotational movement of shaft 54 caused by rotation of armature 74 also rotates armature 74' to a predetermined intermediate position whereby on subsequent short circuiting of the secondary winding 86' an appreciable portion of the flux afforded by primary winding 84' follows the secondary flux path of power unit 75' previously explained, to cause the armature 74' to be rotated into the attracted position with respect to pole pieces 81' and 82' shown in Figure 4. This movement of armature member 74' rotates the shaft 54 and moves valve stem 26 to the left beyond its position shown in Figure 3 to thereby move the valve member 29 to the left and cause the cup-shaped member 34 to be moved to the left therewith, thus moving the valve disk 33 out of engagement with valve seat 18 against the biasing force of compression spring 38. Valve disk 33 is thus moved to its flow-permitting position, shown in dotted lines in Figure 4, in which it permits a considerably larger amount of fluid fuel to flow from the inlet chamber 12 to outlet chamber 14 than is afforded by opening of the valve member 29 only. Such larger fuel flow to the fluid fuel burning device affords a large or high heat flame for the main burner thereof.

In order to provide automatic operation of the afore-described electromagnetic flow control device, and to render the flame size afforded thereby dependent upon prevailing temperature conditions, I employ a two stage temperature responsive circuit controlling device 90 and a temperature responsive bi-metal warp switch 92 both shown in Figures 2 to 4.

The temperature responsive device 90 comprises temperature responsive actuating means which preferably takes the form of an expansible and contractible bellows 94 having a stationary end wall 94a and a movable end wall 94b. The position of the stationary end wall 94a may be defined by an adjusting screw 96 in abutment therewith to permit adjusting of device 90 for response to any desired temperature. The bellows 94 may be filled with an appropriate fluid substance, it merely being necessary for such fluid fill to afford predetermined movement of end wall 94b in response to predetermined changes in temperature. Fixed to and movable with the end wall 94b is an operating shaft 98.

Positioned adjacent the operating shaft 98, are movable contact carriers 100 and 102 pivotally mounted on pins 104 and 106 respectively. I employ biasing means (not shown) between pin 104 and carrier 100 to urge a movable contact 108, mounted on said carrier, toward engagement with a stationary contact 110, said movable contact 108 being movable against such biasing means toward engagement with another stationary contact 112. In like manner, I employ biasing means (also not shown) between pin 106 and carrier 102 to bias a movable contact 114 mounted on the carrier 102 away from engagement with a cooperating stationary contact 116 and toward engagement with a stationary contact or stop member 118.

Any suitable means, such as spaced rings 120 and 122 fixed to or integral with the shaft 98, may be employed to afford movement of the contacts 108 and 114 against their respective biasing means into engagement with stationary contacts 112 and 116, respectively, upon contraction of bellows 94. It will be noted that rings 120 and 122 are so positioned on the operating shaft 98 that upon cooling of the fluid fill within bellows and corresponding movement of end wall 94b, the ring 120 engages carrier 100 and moves contact 108 out of engagement with contact 110 and into engagement with contact 112 prior to engagement of ring 122 with the contact carrier 102. The reverse, of course, is also true in that upon expansion of bellows 94 following engagement of contacts 108 and 112, and 114 and 116, the ring 122 permits contact 114 to be moved to open circuit position with respect to contact 116 prior to movement of contact 108 from engagement with contact 112 and into engagement with contact 110. Since contacts carriers 100 and 102 are actuated at different temperatures, the temperature responsive device 90 is commonly referred to as a two-step or two-stage condition responsive device.

Although not essential to successful practice of the present invention, I prefer to employ an anticipator coil 124 which, as will hereinafter appear, affords artificial heating of the fluid fill of bellows 94 to thereby compensate for the inherent lag in response of the condition responsive device 90 to changes in temperature and to compensate for the inherent lag in the heating system employing the instant invention.

A warp switch 92 comprises stationary contacts 126, 127, 128, and 129 fixed to suitable mounting means such as mounting member 130. The mounting member 130 is formed with opposing notched portions 132 and 134 between which a bi-metal member 136, formed of dissimilar metals, is positioned as shown in Figures 2, 3 and 4 for alternately bridging the contacts 126 and 127, and the contacts 128 and 129 in response to variations in temperature afforded by a heating coil 138. The heating coil 138 is mounted on the mounting member 130 in close proximity to the bi-metal element 136 and affords heating of said element when energized.

As shown in the drawings, one of the lead wires of circuit connecting means 87 is connected to the contact carriers 100 and 102 and one end of the anticipator coil 124 of temperature responsive device 90, while the other lead wire thereof is connected in circuit with the stationary contact 126 and to one end of the heater coil 138 of warp switch 92. One of the lead wires of circuit connecting means 87' is connected to the other end of anticipator coil 124 and the other of said lead wires is connected in circuit with the stationary contacts 116 and 128 of the device 90 and switch 92 respectively as shown in the drawings. A lead wire extends from stationary contact 127 of warp switch 92 to the stationary contact 110 of the device 90, and as shown in the drawings, a lead connecting wire inter-connects the other end of heater coil 138 and stationary contact 129 of the switch 92 in circuit with the stationary contact 112 of the device 90.

The operation of the first embodiment of the present invention will now be explained:

Although it is readily apparent that the present invention is not limited to any single use or application, for the purpose of best explaining the operation thereof and to show its relation to fluid fuel burning apparatus, the following explanation will contemplate connection of the subject flow control device to a space heating unit having a main burner connected to conduit 20 and a pre-ignited pilot or ignition burner juxtaposed with respect to said main burner and afforded a continuous supply of fluid fuel independently of the subject flow control device. The two-stage condition responsive device 90 is positioned within the space or enclosure to be maintained at a predetermined temperature by heat supplied from the main burner.

With secondary windings 86 and 86' in open circuit condition, the subject flow control device is positioned as shown in Figures 1 and 2, namely, with valve member 29 and valve disk 33 in flow-preventing position; such condition of the first embodiment obtaining whenever the two-stage condition responsive device 90 is satisfied, movable contacts 108 and 114 being biased into engagement with stationary contacts 110 and 118, respectively.

As the temperature within the space or enclosure falls below the aforementioned predetermined value, the fluid fill within enclosure 94 contracts, thereby moving end wall 94b and operating shaft 98 in an upward direction as viewed in Figures 2, 3 and 4. Upon sufficient cooling of the air within such enclosure, ring 120 moves contact carrier 100 so as to effect disengagement of movable contact 108 from stationary contact 110 and engagement of said contact with the stationary contact 112. Engagement of contacts 108 and 112 short circuits secondary winding 86 through heater coil 138 thereby positioning armature member 74 in its attracted position with respect to pole pieces 81 and 82 as shown in Figure 3. Such movement of armature member 74 would position valve member 29 so as to provide sufficient fuel for a small or low heat flame at the main burner, but in order to insure safe ignition of the fuel emitted from the main burner, it is necessary to supply a substantially greater fuel flow, for example sufficient to provide a high heat flame. Therefore, in order to provide this safety feature, engagement of contacts 108 and 112 also short circuits secondary winding 86' through a circuit composed of contact 128, bi-metal 136, contacts 129, 112 and 108, and anticipator coil 124. Such short circuiting of secondary winding 86' causes armature member 74' to be attracted by pole pieces 81' and 82' thereby rotating the armatures 74 and 74' to the position of Figure 4 and moving valve member 33 to its flow-permitting position affording sufficient fuel flow to the main burner for ignition of the same on high heat flow conditions. In this manner, whenever the main burner is to be ignited, maximum fuel flow is afforded thereto, thus minimizing faulty ignition and avoiding creation of a hazardous condition.

The electrical current which is caused to flow through secondary winding 86 by engagement of said contacts 108 and 112 also flows through heater coil 138, and the bi-metal element 136 is exposed to the heat generated by such current flow, whereupon after a predetermined time lapse as determined by the heating rate of said element 136, the dissimilar metals of the latter cause it to snap over center from its position shown in Figure 2 to that shown in Figure 3. Such movement of element 136 interrupts the short circuiting means for secondary winding 86' and sets up a circuit, by virtue of its engagement with contacts 126 and 127, for a purpose to be hereinafter explained. Interruption of the shorting circuit for secondary winding 86' causes armature member 74' to be released from its attracted position with respect to pole pieces 81' and 82' thus permitting springs 24 to return shaft 54 and armature members 74 and 74' from their positions shown in Figure 4 to those shown in Figure 3. Such movement, of course, returns valve disk 33 to flow-preventing engagement with valve seat 18 while maintaining valve member 29 in its flow-permitting position with respect to valve seat 32. It is thus seen that upon ignition of the main burner by the pilot flame adjacent thereto, both valve members 29 and valve disk 33 are moved to their flow-permitting positions to provide a large or high heat flame to insure safe ignition, and that after a predetermined interval of time (sufficient to insure safe lighting), the large flame is supplanted by the small or low heat flame if the temperature within the enclosure is not substantially less than the desired temperature.

Upon a further decrease in the temperature within the enclosure, end wall 94b of bellows 94 and operating shaft 98 are moved upwardly as viewed in Figures 2, 3 and 4, whereupon at a predetermined low temperature the movable contact 114 is caused to engage the stationary contact 116. The secondary winding 86' is thereby short circuited through a circuit comprising contacts 116 and 114, contact carrier 102 and anticipator winding 124. Such short circuiting causes armature members 74 and 74' to again be rotated to their positions shown in Figure 4 and valve disk 33 to be moved to its flow-permitting position as above explained. Thus a high heat flame is provided at the main burner in response to a relatively large differential between the desired temperature and the temperature existing within the enclosure.

With movable contact 114 in engagement with stationary contact 116, an increase in temperature within the enclosure causes the reverse operation to take place. That is the fluid fill within bellows 94 gradually expands, moving end wall 94b and operating shaft 98 in a downward direction as viewed in Figures 2, 3 and 4 to first disengage contacts 114 and 116, thereby effecting movement of valve disk 33 to flow-preventing position, and to thereafter disengage contacts 108 from the contact 112 and effect engagement of said contact with the contact 110. It will be noted, however, that valve 29 is not moved to its flow-preventing position simultaneously with the aforementioned switching of the contact 108, but rather is held in its flow-permitting position by virtue of short circuiting of secondary winding 86 through the newly made circuit comprising contact 126, bi-metal element 136, contact 127, contacts 110 and 108, and carrier 100.

Disengagement of contacts 108 and 112 effects de-energization of heater coil 138, wherefor following a predetermined cooling period, bi-metal element 136 snaps out of engagement with contacts 126 and 127 and into engagement with contacts 128 and 129. Opening of the circuit between the contacts 126 and 127 opens this circuit of the secondary winding 86 and effects movement of the valve member 29 to its flow-preventing position shown in Figure 1. Bridging of the contacts 128 and 129 by the bi-metal element 136 sets up the shorting circuit for winding 86' for subsequent re-ignition of the main burner under the safe conditions previously described. The delay in returning valve member 29 to flow-preventing position following disengagement of contacts 108 and 112 prevents re-ignition of the main burner before the bi-metal element 136 has returned to engagement with contacts 128 and 129; the latter condition being necessary to insure ignition of the main burner only under high heat flame conditions.

Figure 5:
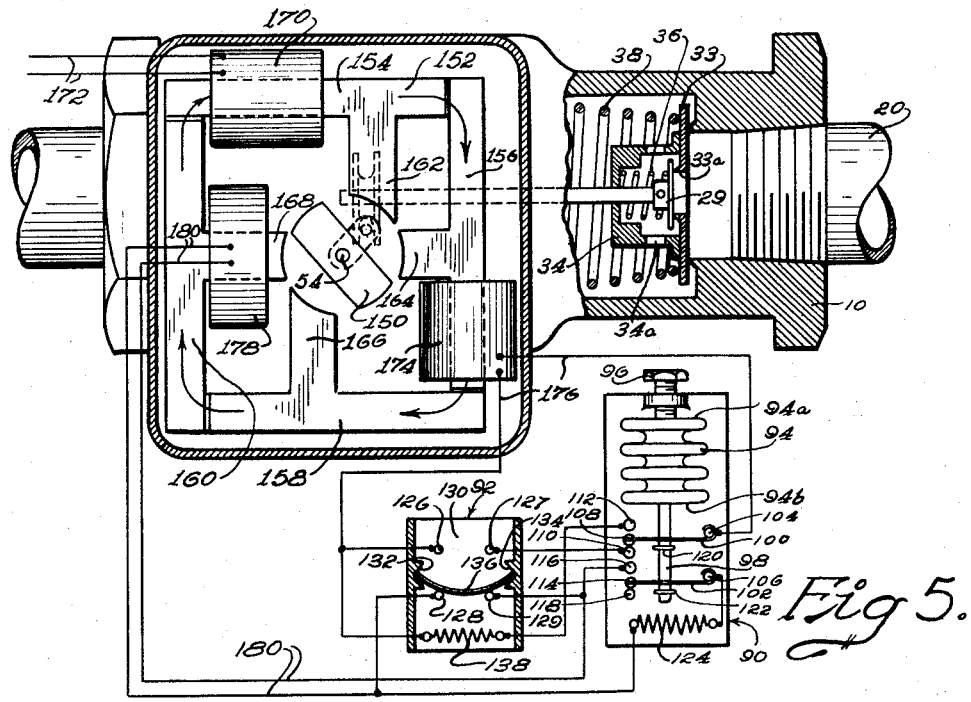
Figure 5 is a fragmentary sectional view of a second embodiment of the present invention in circuit with a two stage condition responsive device and with a heat responsive warp switch, the fluid flow control member being shown in its initial "off" position.
Figure 6:
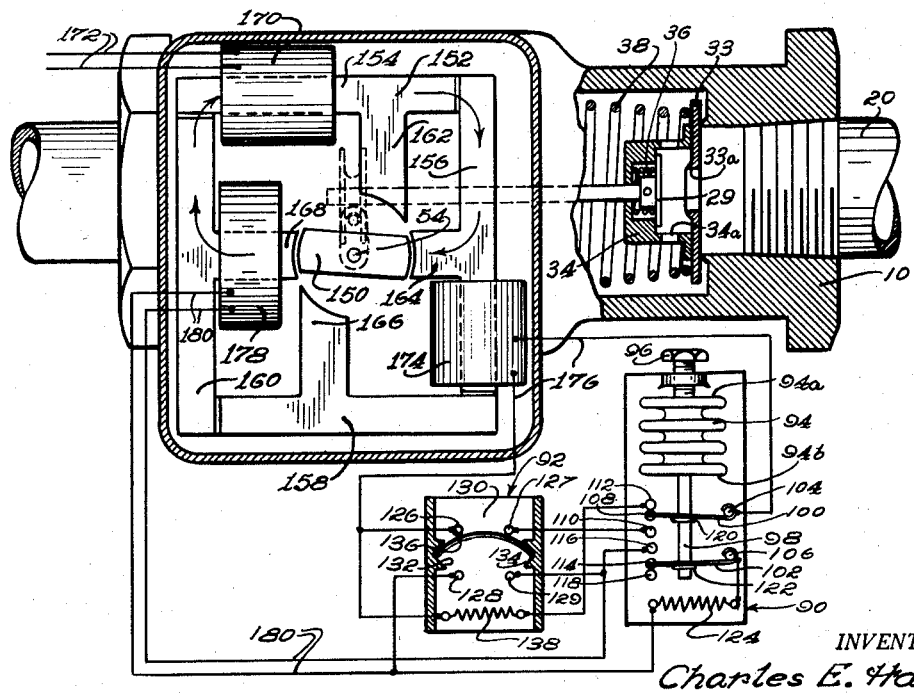
Figure 6 is similar to Figure 5 but shows the fluid flow control member in its first or low heat flame position.
Figure 7:
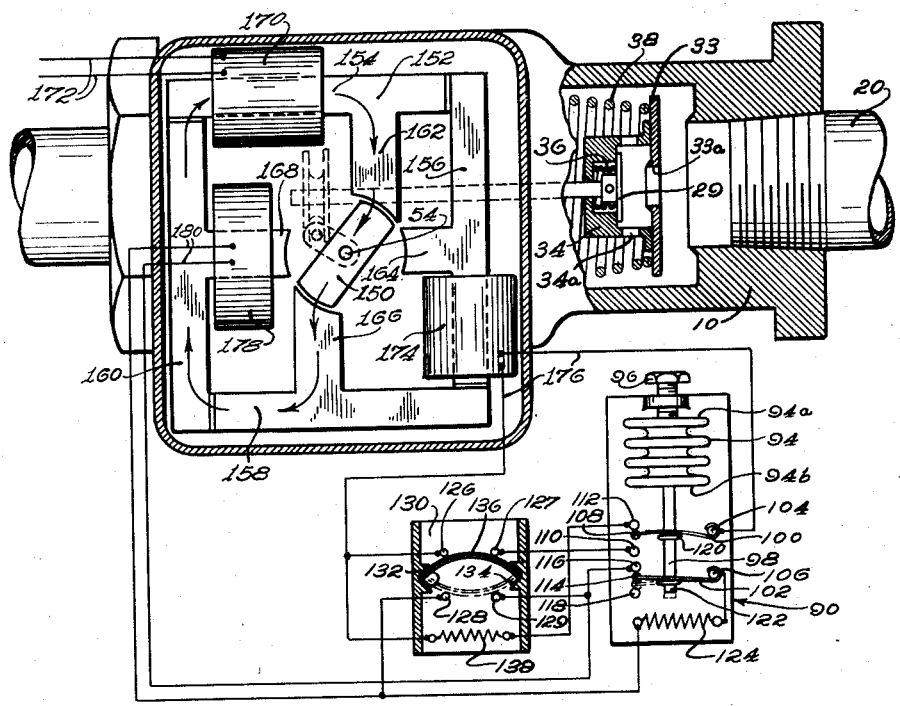
Figure 7 is similar to Figures 5 and 6 but shows the fluid flow control member in its second or high heat flame position.

The second embodiment of the present invention, namely, that shown in Figures 5, 6 and 7 comprises valve member 29, valve disk 33 and many other elements or components identical with those identified with like indicia in Figures 1, 2, 3 and 4. Springs 24, valve stem 26, cup-shaped member 34, compression springs 36 and 38, yoke 72, pin 68, block 70 and shaft 54 are some of the elements which appear in both embodiments. The relationship between shaft 54, valve member 29 and valve disk 33 of the second embodiment is identical with that as above explained with reference to the first embodiment.

In the second embodiment, an armature member 150 is non-rotatably secured to shaft 54 for operation of valve member 29 and valve disk 33 as above explained with reference to the first embodiment. A core member 152 formed of magnetically permeable laminations and having a generally square configuration is provided for magnetic cooperation with the armature member 150; said core member 152 comprising leg portions 154, 156, 158 and 160 providing a primary flux path and formed with extended portions 162, 164, 166 and 168 respectively forming pole pieces. Pole pieces 164 and 168 are oppositely disposed with respect to shaft 54 and cooperate to form a secondary flux path including an air gap therebetween. Pole pieces 162 and 166 are also oppositely disposed with respect to shaft 54 and provide a tertiary flux path having its air gap angularly displaced with respect to the air gap of the aforementioned secondary flux path. Each of the pole pieces 162, 164, 166, and 168 is formed with an arcuate pole face having the axis of rotation of shaft 54 as the axis of curvature thereof providing, with arcuate end surfaces of the armature member 150 equal air gaps between said armature and said pole pieces when the armature is in attracted relation.

Mounted on leg portion 154 of core member 152 is a primary winding 170 having circuit connecting means 172 for connection of said winding to an outside source of power. Energization of primary winding 170 affords flux flow in the primary flux path as diagrammatically shown in Figure 5. The armature member 150 is not influenced by said flux flow and the flat springs 24 are permitted to retain valve member 29 and valve disk 33 in their flow-preventing positions.

Mounted on leg portion 156, is a secondary winding 174 having circuit connection means 176. With flux flowing in the primary path of core member 152 as above explained, short circuiting of secondary winding 174 causes a current flow to be induced therein, said current flow inducing a flux flow in that part of leg portion 156 surrounded by winding 174 to alter the magnetic permeability thereof, whereupon an appreciable portion of the flux provided by winding 170 is caused to be diverted across the air gap between pole pieces 164 and 168 and through the armature 150. Such diverted flux follows the aforementioned secondary path including leg portion 154, pole pieces 164 and 168, and a portion of each of leg portions 156 and 160 as shown in Figure 6. Flux flow between pole pieces 164 and 168 causes armature member 150 to be moved into alignment therewith, thereby moving valve member 29 from its flow-preventing position to its flow-permitting position, as shown in Figure 6, against the force of the compression spring 36. Such movement of armature member 150 does not, however, overcome compression spring 38 which retains the valve disk 33 in seating engagement with valve seat 18. In this position of armature member 150 only a small quantity of fluid fuel is permitted to flow to the main burner, such small quantity providing only a small or low heat flame therefor.

A tertiary winding 178 having circuit connection means 180 is wound on pole piece 168. Shorting of winding 178 while flux is flowing from pole piece 164 to pole piece 168, causes a current to be induced in said tertiary winding 178 and an appreciable portion of the flux flowing between pole pieces 164 and 168 to be diverted to a tertiary flux path including pole pieces 162 and 166 and the armature 150. Such tertiary flux path includes leg portion 160, pole pieces 162 and 166, and a portion of each of leg portions 154 and 158 as diagrammatically shown in Figure 7. Such flux flow between pole pieces 162 and 166 causes armature member 150 to be rotated into alignment therewith, thereby causing shaft 54 to move valve disk 33 from its flow-preventing position to its flow-permitting position against the force of biasing spring 38. Such movement of valve disk 33 permits a large quantity of fluid fuel to flow to the main burner for maintenance of a large or high heat flame at the latter.

Condition responsive device 90 and warp switch 92 as shown in Figures 5, 6 and 7 are identical with such elements 90 and 92 of Figures 2, 3 and 4. For a detailed understanding of such devices, reference is made to the description of the first embodiment of the present invention hereinbefore set forth.

In the second embodiment, one lead wire of circuit connecting means 176 is connected to contact carrier 100 of device 90, while the other lead wire thereof is connected in circuit with heater coil 138 and stationary contact 126 of warp switch 92. The other end of the heater coil 138 is connected in circuit with stationary contact 112 of device 90, while contact 127 of warp switch 92 is connected in circuit with stationary contact 110.

One lead wire of circuit connecting means 180 (for winding 178) is connected in circuit with contact 128 of switch 92 and one end of anticipator winding 124 of the device 90, while the other lead wire of such circuit connecting means is connected in circuit with stationary contacts 129 and 116 of switch 92 and device 90 respectively. As seen in Figures 5, 6 and 7, a lead wire or jumper interconnects the other end of anticipator coil 124 and contact carrier 102 of the two-stage condition responsive device 90.

The operation of the second embodiment of the present invention is as follows:

With conditions as shown in Figure 5, that is, with device 90 satisfied, magnetic flux produced by energization of primary winding 170 from the outside source flows in the primary flux path only, thereby permitting springs 24 to maintain valve member 29 and valve disk 33 in flow-preventing position. With flux flowing in the primary flux path, a decrease in temperature at the device 90 causes retractive movement of the stem 98 thereof and movement of the movable contact member 108 out of engagement with the stationary contact 110 and into engagement with stationary contact 112, the latter operation short circuiting secondary winding 174 through the heater coil 138. Shorting of winding 174 would normally cause valve member 29 to be moved to flow-permitting position while valve disk 33 remains in engagement with valve seat 18, but, in order to provide safe ignition of the main burner, as above explained with respect to the first embodiment, armature member 150 moves beyond its position of Figure 6 to its position shown in Figure 7 due to shorting of tertiary winding 178 through bi-metal element 136 which bridges the contacts 128 and 129 as shown in said Figure 5. Thus, both valve member 29 and valve disk 33 are moved to flow-permitting position by initial engagement of contacts 108 and 112, the main burner thereby being safely ignited by the pilot burner as above explained with respect to the first embodiment.

Short circuiting of the secondary winding 174 through heater coil 138 causes the latter to be energized to afford heat to the bi-metal element 136 thereby causing the latter to be snapped into engagement with contacts 126 and 127 as above explained with reference to the first embodiment. Such movement of bi-metal element 136 opens the circuit of the tertiary winding 178 permitting flux to flow through the pole piece 168 and hence through the secondary path shown in Figure 6. This causes the armature 150 to be moved to its position shown in Figure 6 so that the flame at the main burner is converted from a large to a small, low heat flame as called for by condition responsive device 90.

If the temperature surrounding the device 90 continues to drop, the stem 98 retracts further and the movable contact 114 is moved into engagement with stationary contact 116, thereby short circuiting tertiary winding 178 through a circuit including the anticipator coil 124, contact carrier 102 and contacts 114 and 116. Short circuiting of the winding 178 causes flux flow through the tertiary path shown in Figure 7 and the armature 150 is rotated to its attracted position with respect to pole pieces 162 and 166 shown in said figure, thus causing valve disk 33 to be moved to its flow-permitting position and affording a large quantity of fluid fuel flow to the main burner.

Upon subsequent expansion of bellows 94 in response to a rise in the ambient temperature due to heating of the enclosure by the main burner, the reverse operations take place, namely, firstly, contacts 114 and 116 are disengaged thereby terminating short circuiting of tertiary winding 178 and returning the main burner flame to its small or low heat condition by virtue of closure of valve disk 33. Secondly, upon further expansion of the bellows 94, movable contact 108 is disengaged from contact 112 and is moved into engagement with stationary contact 110. Such movement of contact 108 causes heater coil 138 to be deenergized and, simultaneously therewith, secondary winding 174 is short circuited through bi-metal element 136 which is still in engagement with contacts 126 and 127. After a predetermined cooling period following deenergization of the coil 138, the bi-metal element 136 is snapped out of engagement with contacts 126 and 127, thereby returning secondary winding 174 to its open circuit condition and returning valve member 29 to its flow-preventing position. Such movement of bi-metal element 136 interconnects contacts 128 and 129, thereby setting up or readying the shorting circuit for tertiary winding 178 so that upon subsequent reignition of the main burner, the aforementioned high heat flame condition will obtain to prevent occurrence of a hazardous condition.

As will be noted, upon occurrence of any malfunction such as sticking of either of movable contacts 108 and 114, no hazardous condition can result since the circuit arrangement is such as to provide fail-safe conditions.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. In control apparatus, in combination, a control member biased to an initial position and movable against said bias to first and second operating positions, operating means for said control member comprising first electric means and first cooperating contacts therefor having first and second positions respectively affording deenergization and energization of said first electric means, said means when energized being operable to move said control member from its initial toward its first operating position, second electric means and second cooperating contacts therefor having first and second positions respectively affording deenergization and energization of said second electric means, said second electric means when energized being operable to move said control member from its first toward its second operating position, switch operating means associated with said first and second cooperating contacts and operable in one direction to sequentially move said first contacts from their first toward their second position and their said second contacts from their first toward their second position, said switch operating means being thereafter operable in the reverse direction to sequentially return said second contacts from their second toward their first position and then said first contacts from their second to their first position, time delay means in circuit with said first and second electric means and including a warp switch affording energization of said second electric means for a predetermined period following positioning of said first contacts in their second position while said control member is in its initial position, thereby moving said control member through its first operating position to its second operating position in response to positioning of said first contacts in their second position and holding said control member in said position for said predetermined period.

2. In control apparatus, in combination, a control member biased to an initial position and movable against said bias to first and second operating positions, operating means for said control member comprising a first electric means and first cooperating contacts therefor having first and second positions respectively affording deenergization and energization of said first electric means, said means when energized being operable to move said control member from its initial toward its first operating position, second electric means and second cooperating contacts therefor having first and second positions respectively affording deenergization and energization of said second electric means, said second electric means when energized being operable to move said control member form its first toward its second operating position, switch operating means associated with said first and second cooperating contacts and operable in one direction to sequentially move said first contacts from their first toward their second position and then said second contacts from their first toward their second position, said switch operating means being thereafter operable in the reverse direction to sequentially return said second contacts from their second toward their first position and then said first contacts from their second to their first position, time delay means in circuit with said first and second electric means and including a warp switch affording energization of said second electric means for a predetermined period following positioning of said first contacts in their second position while said control member is in its initial position irrespective of the position of said second contacts, said control member thereby being positioned in its said second operating position and held in such position for said predetermined period in response to positioning of said first contacts in their said second position, said second electric means following said predetermined period being reutrned to control by said second contacts only whereupon said control member is thereafter positioned in accordance with operation of said first and second contacts, said time delay means further including a heater coil for said warp switch energized by operation of said first contacts wherefore said predetermined period is determined by heating of said warp switch by said heater coil.

3. In modulating fluid flow control apparatus, in combination, a fluid flow control valve biased to flow-preventing position and movable against said bias to low and high flow-permitting positions, operating means for said control valve comprising first electric means and first switch means in circuit therewith operable from a first controlling position to a second controlling position to normally cause said first electric means to position said valve in its low flow-permitting position, said operating means further comprising second electric means and second switch means in circuit therewith operable from a first controlling position to a second controlling position to normally cause said second electric means to position said control valve in its high flow-permitting position, time delay interlock means in circuit with said first and second electric means operable for a predetermined time following disposition of said first switch means in its second controlling position while said control valve is in its flow-preventing position to render said second electric means effective to position said control valve in its high flow-permitting position irrespective of the position of said second switch means to thereby insure high fluid flow whenever said control valve is moved from its flow-preventing position, said interlock means after said predetermined time moving from an initial position to effect return of said valve to normal control by said first and second switch means, said interlock means being operable upon disposition of both of said switch means in their first controlling positions to cause said first electric means to retain said control valve in its low flow-permitting position for a predetermined time interval to permit said time delay means to return to its initial position before said control valve is returned to flow-preventing position, thereby insuring movement of said control valve to its high flow-permitting position upon subsequent movement thereof from its flow-preventing position.

4. In modulating fluid flow control apparatus, in combination, a fluid flow control valve biased to flow-preventing position and movable against said bias to low and high flow-permitting positions, operating means for said control valve comprising first electric means and first switch means in circuit therewith operable from open circuit to closed circuit position to afford energization of said first electric means to normally position said valve in its low flow-permitting position, said operating means further comprising second electric means and second switch means in circuit therewith operable from open circuit to closed circuit position while said first electric means is energized to afford energization of said second electric means to position said control valve in its high flow-permitting position, time delay switch means comprising a warp switch in circuit with said first and second electric means and a heater coil for said warp switch in circuit with said first electric means, said warp switch being operable for a predetermined time following disposition of said first switch means in its closed circuit position while said control valve is in its flow-preventing position to energize said second electric means to position said control valve in its high flow-permitting position irrespective of the position of said second switch means to thereby insure high fluid flow whenever said control valve is moved from its flow-preventing position, said warp switch after said predetermined time as determined by the rate of heating of said warp switch by said heater coil moving from an initial position to effect return of said control valve to control by said first and second switch means, said warp switch being operable upon disposition of both of said switch means in their first controlling positions to cause said first electric means to retain said control valve in its low flow-permitting position for a predetermined time interval as determined by the rate of cooling of said warp switch to permit said warp switch to return to its initial position before said control valve is returned to flow-preventing position, thereby insuring movement of said control valve to its high flow-permitting position upon subsequent movement thereof from its flow-preventing position.

5. In a control device, in combination, a control member having a given position and two operating positions, operating means for said control member comprising primary flux path means and means associated therewith to afford two auxiliary flux paths, said operating means including unitary movable magnetically permeable means operatively connected to said control member, said unitary movable means having a given position and being movable as a unit to two operating positions in said auxiliary flux paths corresponding to those of said control member, means biasing said unitary movable means and said control member to their given positions, means for producing flux flow in said primary flux path means, and means for selectively effecting flow of at least a portion of the flux from said primary flux path means through one of said auxiliary paths to thereby position said unitary movable means and said control member in one of their operating positions, said flow effecting means also being operable to selectively effect flow of at least a portion of the flux from said primary flux path means through the other of said auxiliary flux paths to thereby position said unitary movable means and said control member in the other of their operating positions.

6. In a control device, in combination, a control member having a given position and two operating positions, operating means for said control member comprising primary flux path means and means associated therewith to afford two auxiliary flux paths, said operating means including unitary movable magnetically permeable means operatively connected to said control member, said unitary movable means having a given position and being movable as a unit to two operating positions in said auxiliary flux paths corresponding to those of said control member, means biasing said unitary movable means and said control member to their given positions, means for producing flux flow in said primary flux path means, and means for selectively effecting flow of at least a portion of the flux from said primary flux path means through one of said auxiliary paths to thereby magnetically move said unitary movable means against said bias toward one of its operating positions and thereby move said control member toward its corresponding operating position, said flux flow effecting means also being operable to selectively effect flow of at least a portion of the flux from said primary flux path means through the other of said auxiliary flux paths to thereby magnetically move said unitary movable means against said bias toward the other of its operating positions and thereby move said control member toward its corresponding other operating position.

7. In a fluid flow control device, in combination, a flow control member having a flow-preventing position and two operating positions for permitting fluid flow at different levels, operating means for said control member comprising primary flux path means and means associated therewith to afford two auxiliary flux paths, said operating means including unitary movable magnetically permeable means operatively connected to said control member, said unitary movable means having a given position and being movable as a unit to two operating positions in said auxiliary flux paths corresponding to the operating positions of said control member, means biasing said unitary movable means to its given position and said control member to its flow-preventing position, means for producing flux flow in said primary flux path means, and means for selectively effecting flow of at least a portion of the flux from said primary flux path means through one of said auxiliary paths to thereby position said unitary movable means and said control member in one of their operating positions and permit fluid flow at one level, said flux flow effecting means also being operable to selectively effect flow of at least a portion of the flux from said primary flux path means through the other of said auxiliary flux paths to thereby position said unitary movable means and said control member in the other of their operating positions and permit fluid flow at a different level.

8. In a control device, in combination, a control member having a given position and two operating positions, operating means for said control member comprising primary flux path means and means associated therewith to afford two auxiliary flux paths, said operating means including unitary movable magnetically permeable means operatively connected to said control member and having a given position and two operating positions in said auxiliary flux paths corresponding to those of said control member, means biasing said unitary movable means and said control member to their given positions, means for producing flux flow in said primary flux path means, and means including a pair of windings positioned for induction of current therein by the flux produced by said flux producing means, induction of current in one of said windings diverting at least a portion of the flux from said primary flux path means through one of said auxiliary paths to thereby magnetically position said unitary movable means and said control member in one of their operating positions, and induction of current in the other of said windings diverting at least a portion of the flux in said primary flux path means to the other of said auxiliary paths to thereby magnetically position said unitary movable means and said control member in the other of their operating positions.

9. In a control device, in combination, a control member having a given position and two operating positions, operating means for said control member comprising a pair of magnetically permeable core members each having a primary flux path and an auxiliary flux path, said operating means including a separate armature in each of said auxiliary paths said armature being fixedly connected for movement as a unit and being operatively connected to said control member for movement respectively to operating positions by flux flow in said auxiliary paths, said operating means having a given position and two operating positions as provided by said armatures in response to flux flow in their respective auxiliary paths, said operating means positions corresponding to those of said control member, means biasing said operating means and said control member to their given positions, means for producing flux flow in the primary flux paths of said core members simultaneously, and means for diverting at least a portion of the flux from the primary flux path to the auxiliary path of one of said core members to position said operating means and said control member in one of their operating positions, said means also being operable to effect diversion of at least a portion of the flux from the primary path to the auxiliary path of the other of said core members while flux is flowing in the auxiliary flux path of said one core member to position said operating means and said control member in the other of their operating positions.

10. In a control device, in combination, a control member having a given position and two operating positions, operating means for said control member comprising a pair of magnetically permeable core members each having a primary flux path and an auxiliary flux path, said operating means including a rotatable member operatively connected to said control member and a separate armature in each of said auxiliary paths fixed in angularly disposed relation with respect to each other onto said rotatable member and movable as a unit to operating positions by flux flow in said auxiliary paths, said operating means having a given position and two operating positions provided by alignment of the armatures with their respective auxiliary flux paths in response to flux flow therein, the positions of said operating means corresponding to those of said control member, coil means about said core members for producing flux flow in said primary flux paths simultaneously, means biasing said operating means and said control member to their given positions, and means including a first winding about the primary flux path of one of said core members and circuit completing means therefor including a first switch for short circuiting said first winding for induction therein of a current flow to effect diversion of at least a portion of the flux from the primary flux path of said one core member through its auxiliary path for alignment therewith of the respective armature and positioning of said operating means and control member in one of their operating positions, said means further including a second winding about the primary flux path of the other core member and circuit completing means therefor including a second switch for short circuiting said second winding for induction therein of a current flow therein to effect diversion of at least a portion of the flux from the primary path of the other of said core members to its auxiliary path while flux is flowing through the auxiliary path of said one core member for alignment therewith of the respective armature and positioning of said operating means and control member in the other of their operating positions.

11. In a control device, in combination, a control member having a given position and two operating positions, operating means for said control member comprising a magnetically permeable core member having a primary flux path and two auxiliary flux paths, said operating means including a unitary movable armature operatively connected to said control member and having a given position and two operating positions in said auxiliary flux paths corresponding to those of said control member, means biasing said armature and said control member to their given positions, means for producing flux flow in said primary flux path, and means for effecting diversion of at least a portion of the flux from said primary flux path through one of said auxiliary paths to thereby position said armature and said control member in one of their operating positions, said flux diverting means also being operable to alternatively divert at least a portion of the flux from said primary flux path through the other of said auxiliary paths to thereby position said armature and said control member in the other of their operating positions.

12. In a control device, in combination, a control member having a given position and two operating positions, operating means for said control member comprising a magnetically permeable core member having a primary flux path and two auxiliary flux paths angularly disposed with respect to each other, said operating means including a rotatable unitary armature operatively connected to said control member and having a given position and two operating positions in alignment with each of said auxiliary flux paths respectively, the positions of said armature corresponding to those of said control member, means biasing said armature and said control member to their given positions, coil means for producing flux flow in said primary flux path, and means for effecting diversion of at least a portion of the flux from said primary flux path through one of said auxiliary paths to rotate said armature to and position said control member in one of their operating positions, said flux diverting means also being operable to alternatively divert at least a portion of the flux from said primary flux path through the other of said auxiliary paths to thereby rotate said armature to and position said control member in the other of their operating positions.

13. In a control device, in combination, a control member having a given position and two operating positions, operating means for said control member comprising a magnetically permeable core member having a primary flux path and two auxiliary flux paths angularly disposed with respect to each other, said operating means including a rotatable unitary armature operatively connected to said control member and having a given position and two operating positions in alignment with said auxiliary flux paths respectively, the positions of said armature corresponding to those of said control member, coil means about said core member for producing flux flow in said primary flux path, means biasing said armature and said control member to their given positions, and means including a first winding about said primary flux path and a first switch for effecting diversion of at least a portion of the flux from said primary flux path through one of said auxiliary paths for rotation of said armature to and positioning of said control member in one of their operating positions, said means further including a second winding and a second switch operable to alternatively effect diversion of at least a portion of the flux from said primary flux path to the other of said auxiliary paths to thereby rotate said armature to and position said control member in the other of their operating positions.

14. In a control device, in combination, a control member having a given position and two operating positions, operating means for said control member comprising a magnetically permeable core member having a primary flux path and two auxiliary flux paths angularly disposed with respect to each other, said operating means including a rotatable unitary armature operatively connected to said control member and having a given position and two operating positions in alignment with said auxiliary flux paths respectively, the positions of said armature corresponding to those of said control member, coil means about said core member for producing flux flow in said primary flux path, means biasing said armature and said control member to their given positions, and means including a first winding about said primary flux path and circuit completing means therefor including a first switch for short circuiting said first winding for induction in the latter of a current increasing the reluctance of a portion of said primary flux path and effecting diversion of at least a portion of the flux from said primary flux path through one of said auxiliary paths for rotation of said armature to and positioning of said control member in one of their operating positions, said means further including a second winding about said one auxiliary flux paths and circuit completing means therefor including a second switch for short circuiting said second winding while said first winding is short circuited for induction in said second winding of a current increasing the reluctance of a portion of said one auxiliary flux path and effecting diversion of at least a portion of the flux from said one auxiliary path to the other to thereby rotate said armature to and position said control member in the other of their operating positions.

References Cited in the file of this patent

UNITED STATES PATENTS

| | | |
|---|---|---|
| 1,569,994 | Martin | Jan. 19, 1926 |
| 1,849,163 | Wilhjelm | Mar. 15, 1932 |
| 1,979,127 | Warrick | Oct. 30, 1934 |
| 2,298,621 | Holland Letz | Oct. 13, 1942 |
| 2,461,608 | Laing | Feb. 15, 1949 |
| 2,490,420 | Davis | Dec. 6, 1949 |
| 2,526,069 | Douglas | Oct. 17, 1950 |
| 2,585,477 | Leslie et al. | Feb. 12, 1952 |
| 2,687,870 | Matthews | Aug. 31, 1954 |
| 2,756,370 | Meusy | July 24, 1956 |
| 2,767,923 | Matthews | Oct. 23, 1956 |